United States Patent [19]

Parry et al.

[11] Patent Number: 5,369,720
[45] Date of Patent: Nov. 29, 1994

[54] OPTICAL FIBRE CABLE INCORPORATING A STACK OF FIBRE RIBBON ELEMENTS

[75] Inventors: Mark J. Parry, Ware; Desmond J. Kenny, Sawbridgeworth; Philip A. Norman, Bishops, all of United Kingdom

[73] Assignee: Northern Telecom Limited, Montreal, Canada

[21] Appl. No.: 139,446

[22] Filed: Oct. 20, 1993

[30] Foreign Application Priority Data

Oct. 21, 1992 [GB] United Kingdom ............. 9222119.1

[51] Int. Cl.$^5$ ............................................. G02B 6/44
[52] U.S. Cl. ................................... 385/114; 385/112; 385/113
[58] Field of Search .................... 385/106–114

[56] References Cited

U.S. PATENT DOCUMENTS

| | | | |
|---|---|---|---|
| Re. 33,459 | 11/1990 | Bohannon, Jr. et al. | 385/107 |
| 3,745,232 | 7/1973 | Johnson et al. | 174/107 |
| 4,699,461 | 10/1987 | Taylor et al. | 385/110 |
| 4,828,349 | 5/1989 | Nakasuji | 385/114 X |
| 4,900,126 | 2/1990 | Jackson et al. | 385/114 |
| 4,984,859 | 1/1991 | Fujigaki et al. | 385/114 |
| 5,002,358 | 3/1991 | Beresford | 385/113 |
| 5,199,096 | 3/1993 | Kathiresan et al. | 385/109 |
| 5,249,249 | 9/1993 | Eoll et al. | 385/114 |

Primary Examiner—John D. Lee
Attorney, Agent, or Firm—Lee, Mann, Smith, McWilliams, Sweeney & Ohlson

[57] ABSTRACT

In an optical fibre cable, the transmission package comprises a stack (11) of ribbon fibre elements (110) secured within a metal tube (12) by an adhesive (13). The adhesive has a peel strength sufficiently low to permit separation of the individual ribbon from the stack, e.g. to effect jointing operations. Advantageously the adhesive is foamed by injection of a gas during cable manufacture.

10 Claims, 4 Drawing Sheets

OPTICAL FIBRE CABLE INCORPORATING A STACK OF FIBRE RIBBON ELEMENTS

This invention relates to optical fibre cables and to a method of making such cables.

BACKGROUND OF THE INVENTION

A continuing problem in the development of optical fibre cables is that of providing a high fibre count in a small cable volume in an effort to reduce costs. In a conventional cable construction a number of fibres are disposed around a central strength member or king wire which provides strain relief for the fibres. In such an arrangement the number of fibres that can be accommodated is restricted by the limited space around the king wire. In an attempt to overcome this problem various workers have investigated structures incorporating ribbon fibre elements. Such structures generally comprise a core member having a number of longitudinal slots each of which contains one or more fibre ribbons. Although these cable structures can provide a high fibre count, the cable is relatively bulky and is thus unsuitable, e.g. for aerial or for submarine applications where the weight and volume of the cable must be minimised. The object of the invention is to provide a fibre optic cable having a high fibre count and a compact construction.

SUMMARY OF THE INVENTION

According to the invention there is provided an optical fibre cable including a stack of optical fibre ribbon elements enclosed in and supported by a tubular metal sheath, said ribbon elements being secured to the sheath by an adhesive material having a peel strength sufficiently low to allow separation of the ribbon elements from the sheath and individual fibres from the ribbon elements, whereby to access said fibres.

According to another aspect of the invention there is provided a method of making an optical fibre cable, the method including providing a stack of optical fibre ribbon elements, inserting the elements into a metal tube and providing an adhesive whereby to secure the stack of ribbon elements to the tube, and wherein the adhesive has a peel strength sufficiently low to allow separation of the stack of ribbon elements from the tube and individual ribbon elements from the stack whereby to access the fibres.

We have found that the adhesive has sufficient tensile strength to support the fibres and prevent strain thereof by preventing slippage between the ribbons of the stack and by preventing slippage between the stack and the tube. However, the peel strength of the adhesive is sufficiently low to permit easy access of the ribbons to allow jointing or termination of the cable. Typically each ribbon comprises a strip of parallel fibres held together by an acrylate coating.

In a preferred embodiment, the adhesive securing the stack of ribbon elements to the sheath foamed.

The invention is of application to the optical fibre cable field, and in particular to aerial cables, e.g. groundwires, and to submarine cables. By improving the accessibility of the individual fibres of a ribbon stack within a cable, the introduction of ribbon stacks to cable applications is facilitated. This in turn allows the traffic handling capacity of these cables to be increased in comparison with a conventional cable having individual fibres or individual ribbon elements.

BRIEF DESCRIPTION OF THE DRAWINGS

Embodiments of the invention will now be described with reference to the accompanying drawings in which.

DESCRIPTION OF PREFERRED EMBODIMENT

Figure 1:
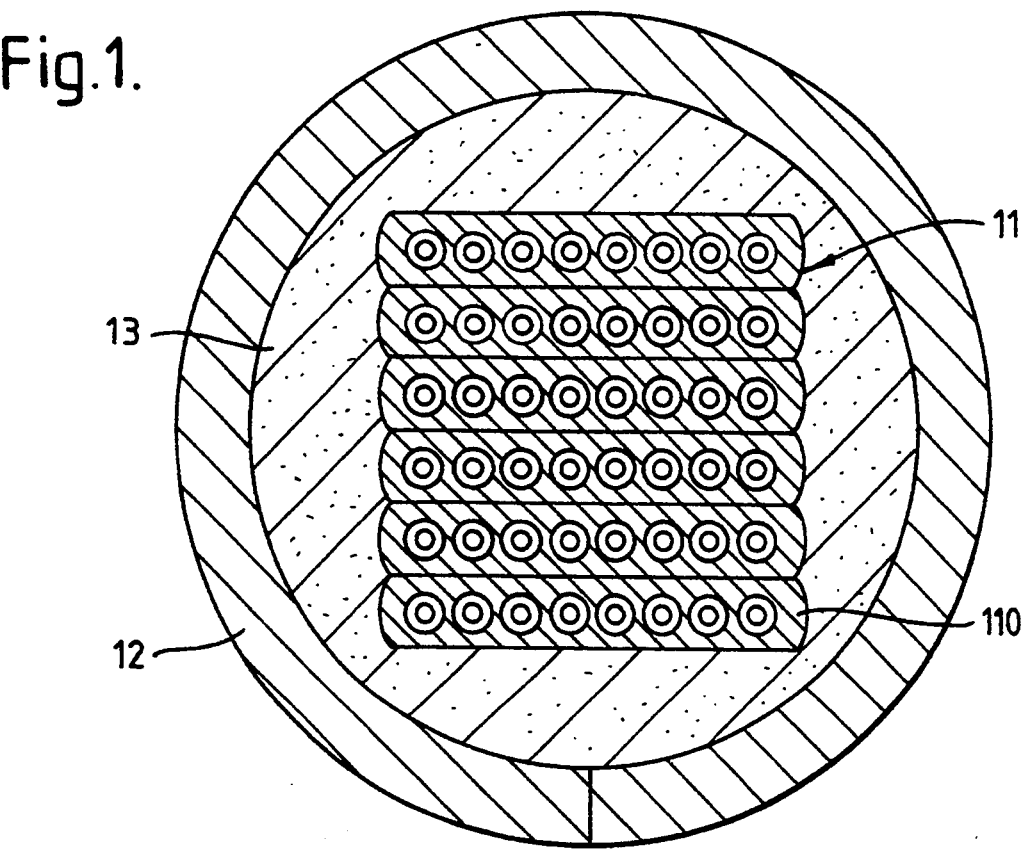
FIG. 1 is a cross-sectional view of a high fibre count transmission package for an optical cable.

Referring to FIG. 1, the transmission package comprises a stack 11 of optical fibre ribbon elements 110 contained in a metal tube 12. Typically the tube 12 is formed from an extruded C-section, e.g. of aluminium, steel or copper, which is closed into a tube around the ribbon stack. Alternatively, where a copper or aluminium tube is employed, this may be extruded on to the ribbon stack, e.g. by a conform process. The ribbon stack 11 may be manufactured by feeding the ribbon elements 110 through a lay-up die and then through a coating die where a polymeric material is applied to the stack so as to secure the ribbon elements together. The individual ribbons may be formed by an encapsulation process or an edge bonding process.

The ribbon stack is secured within the tube 12 by an adhesive 13. This may comprise a hot melt adhesive, a UV curable acrylate adhesive or an anaerobic adhesive. The stack 11 may either be extrusion encapsulated with the adhesive and subsequently sealed into the metal tube, or the stack may be encapsulated and sealed into the tube in a single operation. It will be appreciated that anaerobic adhesives can be employed only in the single operation technique as the absence of air or oxygen is essential to effect curing.

We have successfully employed hot melt adhesives and UV curable acrylates as the stack adhesive, and we have successfully employed hot melt adhesives and anaerobic adhesives as encapsulants.

A number of materials may be employed as the encapsulant/adhesive. In general the material must have the following properties.

1. It must cure or solidify before the completed package is wound on to a storage drum.
2. It must adhere to the ribbon containing material and to the inner surface of the tube 12.
3. The adhesive bond to the ribbon must fail below the tensile/tear strength of the material. The tear strength must be lower than the tensile strength to allow the ribbon stacks to be stripped from the bulk material to allow easy access to the individual fibres.

Suitable melt flow adhesives include, but are not limited to ethylene vinyl acetate, ethylene butyl acetate, ethylene ethyl acetate, polyamides, polyethylenes and polyester elastomers.

In a preferred embodiment, the adhesive securing the ribbon stack to the sheath is foamed. This has a number of advantages over the use of unfoamed systems.

1. The foamed adhesive allows pressure generated by subsequent heating processes to be relieved thus avoiding optical loss problems.

2. The foamed adhesive provides effective coupling between the ribbon stack and the sheath.

3. As a smaller quantity of adhesive material is required there is a significant cost reduction.

4. The foam provides a thermal barrier between the sheath and the ribbon stack.

5. No extra process stages are required.

The adhesive may be foamed during the manufacture of the cable by injecting the molten or liquid adhesive with a gas e.g. nitrogen. The foamed material is then directed between the ribbon stack 11 and the tube 12 as the latter is closed around the ribbon stack.

In an alternative technique, the adhesive may be foamed by the use of a chemical blowing agent.

We have found that the mechanical properties of the package structure is dominated by the mechanical properties of the tube and any anisotropic mechanical properties of the ribbon stack are not apparent in the finished package.

In this package structure the straight lay-up of the fibres allows for no strain relief of the fibres, but we have found that with this construction no strain relief is in fact necessary as the metal tube provides adequate support of the fibres. For submarine cable applications the major strain is experienced during the laying of the cable. Once installed the cable will not, in general be subjected to further mechanical strain. For aerial cable applications, e.g. for use as an optical groundwire, the cable may be subjected to 0.5% strain during normal use and up to about 0.8% under sever weather conditions. To meet these conditions we prefer to employ proof tested fibres. For aerial cable applications we prefer to employ 2% proof tested fibre, while for submarine applications 1.5% proof tested fibre is adequate. We have also employed hermetic fibre in aerial cable applications.

Such an aerial cable may be installed on the support pylons of an electrical overload transmission line. Advantageously, the cable may function as the groundwire or star point conductor of that line.

We have found that the use of a ribbon stack simplifies the identification of the individual fibres to effect termination or jointing as it is necessary to colour only one fibre in each ribbon in order to identify all fibres of the stack. Further, the use of ribbons significantly increases the speed with which splices can be made. For example, modern splicing equipment can fusion splice ribbons comprising up to twelve fibres in a single application.

Figure 2:
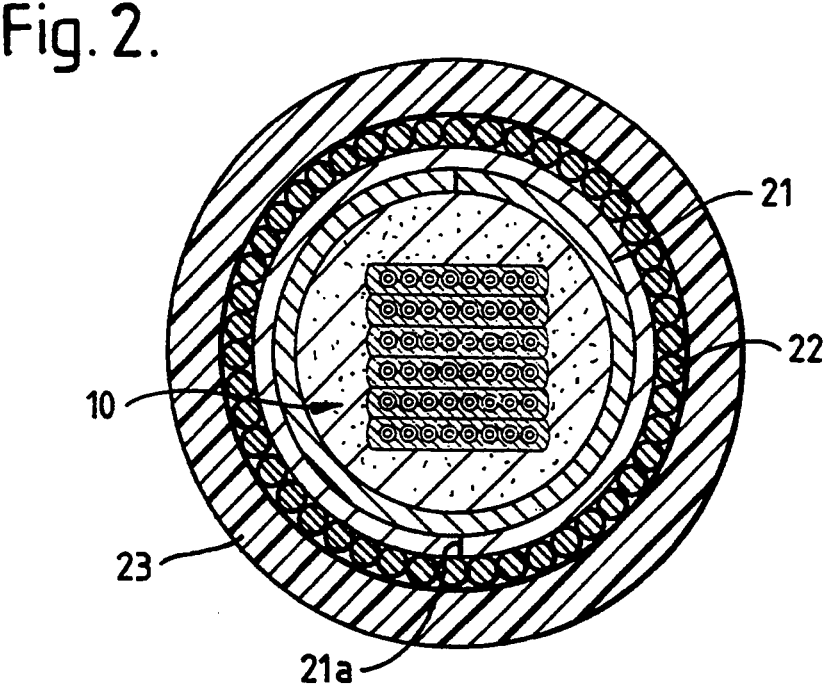
FIG. 2 is a cross-sectional view of a submarine cable incorporating the transmission package of FIG. 1.

Referring now to FIG. 2, this shows in cross-sectional view a submarine cable construction using the transmission package of FIG. 1. The package 10 is hermetically sealed within a metal, e.g. copper tube 21 which may be applied in the form of a longitudinal tape which is folded around the package and welded along the seam 21a. One or more layers of high tensile steel strength wires 22 are applied to the tube 21. The assembly is contained with an outer plastics sheath 23 applied by extrusion. The structure may be provided with an outer armouring layer (not shown).

The use of an adhesive to secure the fibre stack 11 to the tube 12 is of particular advantage in submarine applications as this obviates the need to anchor the fibres when effecting jointing or coupling to a repeater. It will be appreciated that, unlike a land cable, a submarine cable may be under considerable tension whilst jointing is being effected.

Figure 3:
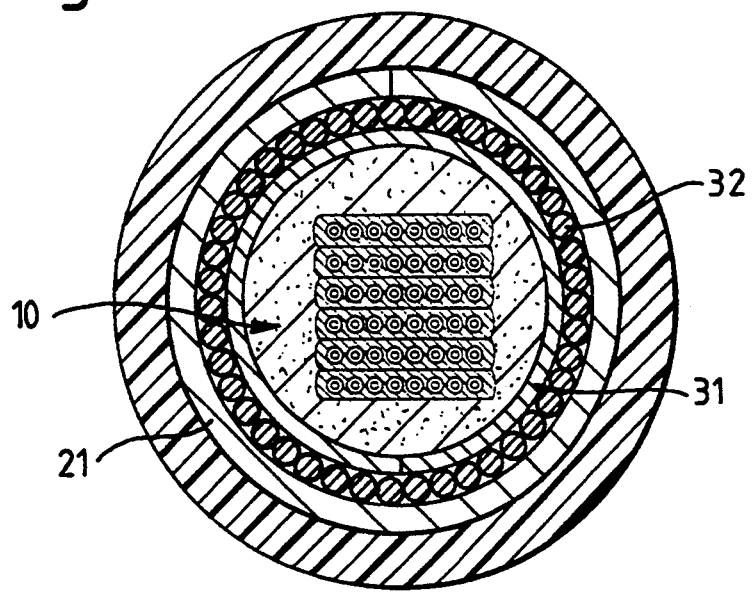
FIG. 3 shows an alternative submarine cable construction.

An alternative submarine cable construction is shown in FIG. 3. This is similar to the arrangement of FIG. 2 but in this arrangement the strength member wires 32 are contained within the welded metal tube 31.

In another submarine cable construction (not shown) the space between the fibre stack and the surrounding tube is filled with a water blocking gel compound, e.g. HYVIS, which allows relative movement between the fibre stack and the tube.

Figure 4:
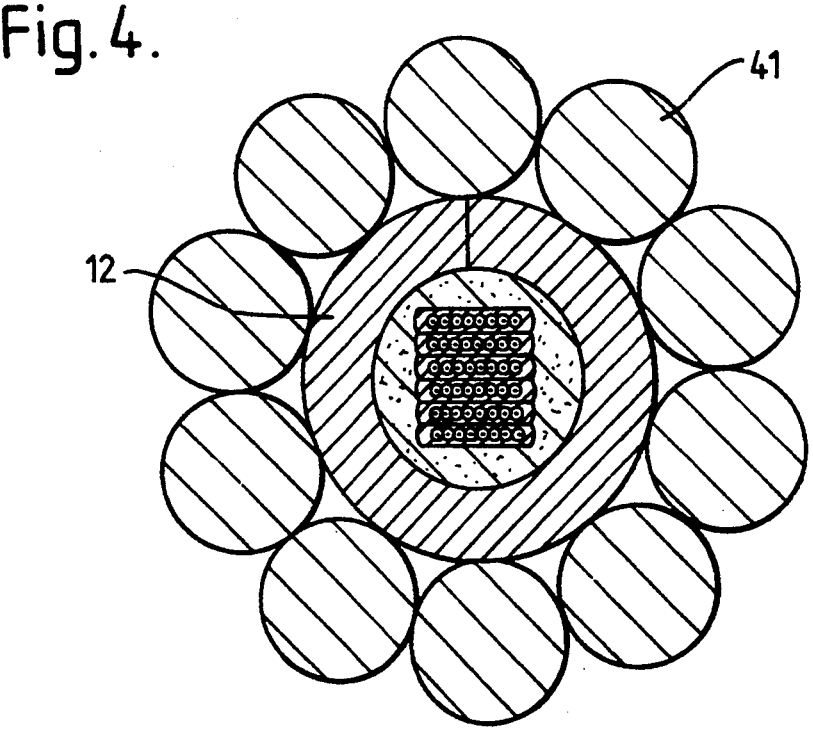
FIG. 4 is a cross-sectional view of an aerial cable or groundwire incorporating the transmission package of FIG. 1.

FIG. 4 shows an aerial cable or groundwire construction. In this arrangement we prefer to provide a weld along the seam of the tube 12 to hermetically seal the fibre ribbon stack. Alternatively a directly extruded tube may be provided. The package is enclosed within a layer of electrically conductive wires 41 which may comprise aluminium, aluminium alloy or aluminium coated steel. The cable is intended for use as a groundwire for an overhead electric transmission line.

Figure 5:
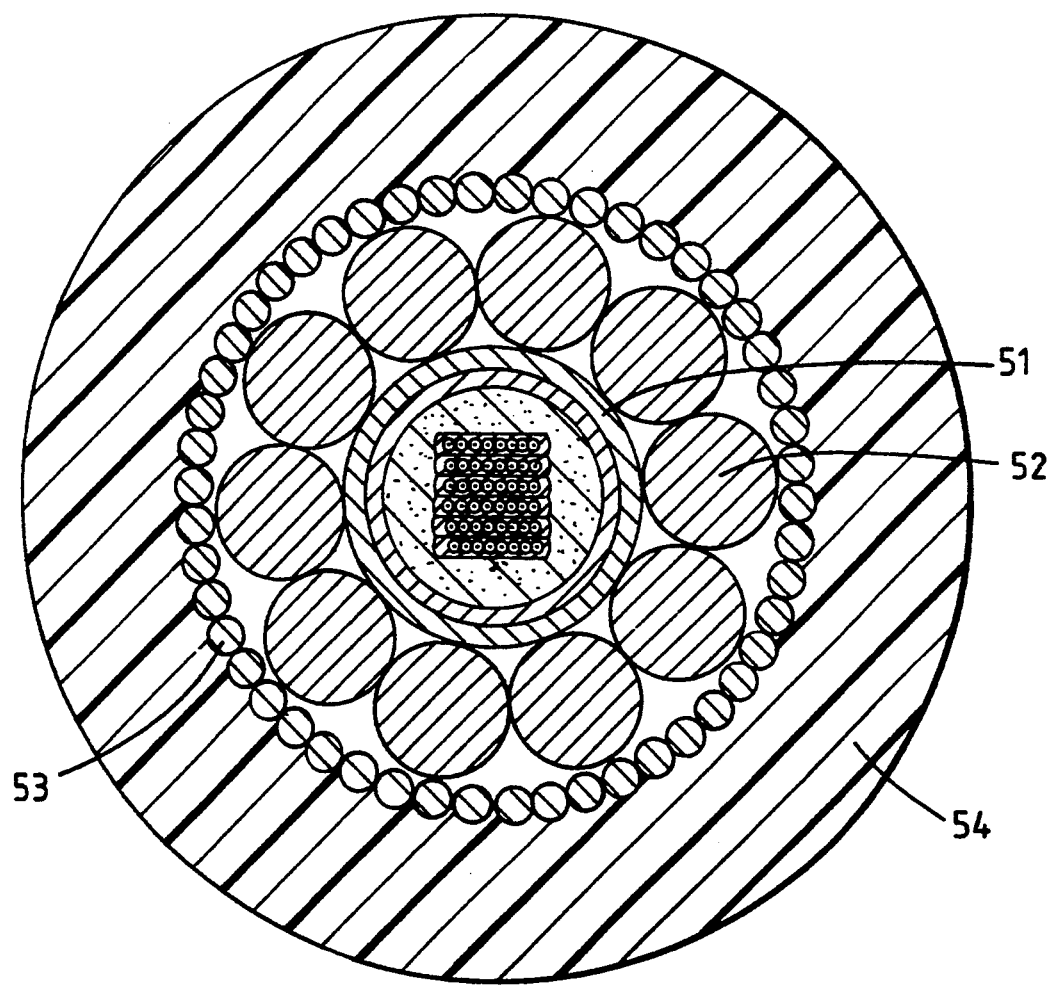
FIG. 5 shows a further submarine cable construction.

A further submarine cable construction is shown in cross-section in FIG. 5. In this arrangement the transmission package is contained within a welded metal e.g. copper tube 51 around which a number of relatively large diameter tensile strength wires 52 are disposed. A further layer of relatively small diameter strength wires 53 is disposed around the wires 52. Typically the wires 52 and 53 are both formed from high tensile steel. The outer layer of wires 53 may perform an armouring function in addition to providing tensile strength. The structure provides a rugged cable construction. The structure is contained within an extruded plastics sheath 54.

Figure 6:
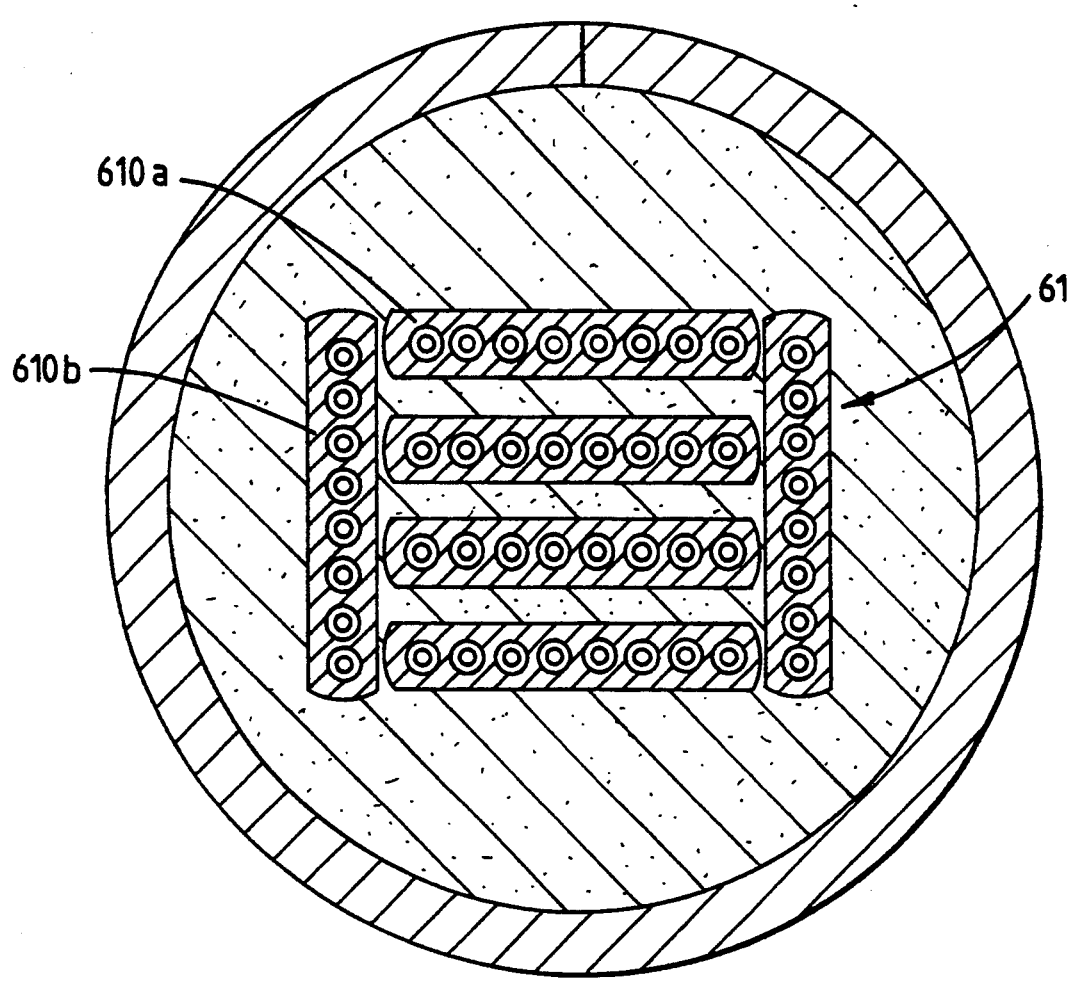
FIG. 6 shows an alternative transmission package construction.

An alternative transmission package construction is shown in FIG. 6. This differs from the arrangement of FIG. 1 only in the construction of the ribbon stack 61. In the arrangement of FIG. 6 the stack comprises a number of ribbons 610a arranged generally parallel to each other and a further pair of ribbons 610b arranged perpendicular to the ribbons 610a and in abutment with the edges of those ribbons. This arrangement has substantially anisotropic mechanical properties, and is thus easy to handle during the manufacture of the cable.

Although the above cable constructions have been described with particular reference to submarine and to aerial cables it will be appreciated that they may also be employed in land cable applications.

We claim:

1. An optical fibre cable, including a stack of optical fibre ribbon elements enclosed in and supported by a tubular metal sheath, said stack of ribbon elements being secured to the sheath by an adhesive material selected from the group consisting of melt flow adhesives and ultraviolet curable adhesives, wherein there is substantially no overfeed of the stack of ribbon elements relative to the metal sheath, wherein said adhesive has sufficient tensile strength such that tensile forces applied in use to the cable are carried by the sheath whereby to protect the stack of ribbon elements from said forces, and wherein said adhesive has a peel strength sufficiently low as to allow separation of the ribbon elements from the sheath and separation of individual fibres from the ribbon elements whereby to access said fibres.

2. An optical fibre cable as claimed in claim 1, wherein said adhesive is foamed.

3. An optical fibre cable as claimed in claim 2, wherein said tubular sheath is enclosed within a further tube.

4. An optical fibre cable as claimed in claim 3, wherein said further tube comprises a metal tape formed into a cylinder and welded along the seam whereby to provide a hermetic seal.

5. An optical fibre cable as claimed in claim 4 and comprising a submarine cable.

6. An optical fibre cable as claimed in claim 5, wherein said tubular metal sheath is formed from a C-section metal extrusion closed into a tube around the stack of ribbon elements.

7. An optical fibre cable as claimed in claim 6 and further comprising a plurality of wire strength members disposed around said tubular sheath, a further metal tube enclosing the wire strength members, and an outer plastics sheath.

8. An optical fibre cable as claimed in claim 1, wherein said tubular sheath comprises an extruded metal tube.

9. An optical fibre cable as claimed in claim 8, wherein said tube is enclosed within a layer of electrically conductive wires.

10. An optical fibre cable as claimed in claim 9, and comprising an optical cable or groundwire.

* * * * *